US012345400B2

(12) United States Patent
Tuller et al.

(10) Patent No.: US 12,345,400 B2
(45) Date of Patent: Jul. 1, 2025

(54) DETERRENT DEVICE ATTACHMENT HAVING LIGHT SOURCE WITH THERMAL MANAGEMENT

(71) Applicant: Crosman Corporation, Bloomfield, NY (US)

(72) Inventors: Jeffrey D. Tuller, Rochester, NY (US); Michael W. Allen, Shortsville, NY (US)

(73) Assignee: Crosman Corporation, Bloomfield, NY (US)

( * ) Notice: Subject to any disclaimer, the term of this patent is extended or adjusted under 35 U.S.C. 154(b) by 0 days.

(21) Appl. No.: 18/399,410

(22) Filed: Dec. 28, 2023

(65) Prior Publication Data

US 2024/0210024 A1 Jun. 27, 2024

Related U.S. Application Data

(63) Continuation of application No. 17/971,371, filed on Oct. 21, 2022, now Pat. No. 11,859,806, which is a continuation of application No. 16/195,115, filed on Nov. 19, 2018, now Pat. No. 11,480,325, which is a (Continued)

(51) Int. Cl.

| | |
|---|---|
| ***F21V 23/06*** | (2006.01) |
| ***F21V 23/00*** | (2015.01) |
| ***F21V 29/70*** | (2015.01) |
| ***F41G 1/35*** | (2006.01) |
| ***F41H 13/00*** | (2006.01) |
| *F21V 29/507* | (2015.01) |

(Continued)

(52) U.S. Cl.

CPC ............ *F21V 29/70* (2015.01); *F21V 23/006* (2013.01); *F41G 1/35* (2013.01); *F41H 13/0087* (2013.01); *F21V 29/507* (2015.01); *F21V 29/76* (2015.01); *F21V 33/0076* (2013.01)

(58) Field of Classification Search

CPC .... F21V 29/503; F21V 19/045; F21V 23/006; F41G 1/35

See application file for complete search history.

(56) References Cited

U.S. PATENT DOCUMENTS 4,148,094 A 4/1979 Bennett
4,627,183 A 12/1986 Stuckman
5,119,576 A 6/1992 Erning (Continued)

FOREIGN PATENT DOCUMENTS

CN 201124696 10/2008
CN 202215953 U 5/2012

(Continued)

OTHER PUBLICATIONS

Office Action for U.S. Appl. No. 14/665,775, mailed on Nov. 9, 2017, Tuller, "Deterrent Device Attachment Having Light Source With Thermal Management", 12 pages.

(Continued)

*Primary Examiner* — Julie A Bannan

(74) *Attorney, Agent, or Firm* — Lee & Hayes, P.C.

(57) ABSTRACT

Deterrent device attachments are provided each having a light emitting thermal source positioned by a support board to emit light from within a housing of the deterrent device, with the support board bent to provide surface areas to dissipate heat generated by the light emitter.

17 Claims, 17 Drawing Sheets

Related U.S. Application Data continuation of application No. 14/665,775, filed on Mar. 23, 2015, now Pat. No. 10,132,485.

(60) Provisional application No. 61/939,757, filed on Feb. 14, 2014.

(51) Int. Cl.
*F21V 29/76* (2015.01)
*F21V 33/00* (2006.01)

(56) References Cited

U.S. PATENT DOCUMENTS

| | | | | |
|---|---|---|---|---|
| 5,237,773 | A | 8/1993 | Claridge | |
| 5,375,362 | A | 12/1994 | McGarry | |
| 5,408,395 | A * | 4/1995 | Schmid | F21V 19/04 362/240 |
| 5,410,815 | A | 5/1995 | Parikh | |
| 6,230,431 | B1 | 5/2001 | Bear | |
| 6,921,181 | B2 | 7/2005 | Yen | |
| 6,966,677 | B2 | 11/2005 | Galli | |
| 7,121,680 | B2 | 10/2006 | Galli | |
| 7,153,004 | B2 | 12/2006 | Galli | |
| 7,226,183 | B2 | 6/2007 | Galli | |
| 7,309,147 | B2 | 12/2007 | Martin | |
| 7,517,108 | B2 | 4/2009 | Galli | |
| 7,633,229 | B1 | 12/2009 | Malkoff | |
| 7,652,303 | B2 | 1/2010 | Galli | |
| 7,784,963 | B2 | 8/2010 | Galli | |
| 7,797,873 | B2 | 9/2010 | Gering | |
| 8,387,294 | B2 | 3/2013 | Bolden | |
| 8,662,694 | B1 | 3/2014 | Izumi et al. | |
| 2,015,037 | A1 | 12/2015 | Tuller et al. | |
| 2004/0246737 | A1 * | 12/2004 | Voelker | B60Q 1/444 362/543 |
| 2007/0086190 | A1 | 4/2007 | Kukuk | |
| 2007/0240355 | A1 | 10/2007 | Hsu | |
| 2009/0109691 | A1 | 4/2009 | Chuang | |
| 2011/0028015 | A1 | 2/2011 | Mostoller et al. | |
| 2011/0058387 | A1 | 3/2011 | Matsunaga et al. | |
| 2011/0298371 | A1 | 12/2011 | Brandes et al. | |
| 2012/0075854 | A1 | 3/2012 | Maxik et al. | |
| 2012/0085015 | A1 | 4/2012 | Wei | |
| 2012/0092885 | A1 | 4/2012 | Hong et al. | |
| 2013/0088880 | A1 | 4/2013 | Duan et al. | |
| 2013/0301277 | A1 | 11/2013 | Van De Moesdijk et al. | |
| 2014/0104585 | A1 | 4/2014 | Kadotani et al. | |
| 2014/0340913 | A1 | 11/2014 | Cui | |
| 2015/0103552 | A1 | 4/2015 | Aiso | |
| 2015/0377470 | A1 | 12/2015 | Tuller et al. | |
| 2023/0130957 | A1 | 4/2023 | Tuller | |
| 2024/0210024 | A1 | 6/2024 | Tuller et al. | |

FOREIGN PATENT DOCUMENTS

| | | | |
|---|---|---|---|
| CN | 202868637 | U | 4/2013 |
| CN | 103234185 | A | 8/2013 |
| CN | 203273823 | U | 11/2013 |
| CN | 104006364 | A | 8/2014 |

OTHER PUBLICATIONS

Office Action for U.S. Appl. No. 16/195,115, mailed on Feb. 2, 2022, Tuller, "Deterrent Device Attachment Having Light Source With Thermal Management", 8 Pages.

Office Action for U.S. Appl. No. 16/195,115, mailed on Jul. 29, 2020, Tuller, "Deterrent Device Attachment Having Light Source With Thermal Management", 13 Pages.

Office Action for U.S. Appl. No. 16/195,115, mailed on Sep. 14, 2021, Tuller, "Deterrent Device Attachment Having Light Source With Thermal Management", 10 pages.

Office Action for U.S. Appl. No. 17/971,371, mailed on Feb. 21, 2023, Jeffrey D. Tuller, "Deterrent Device 5 Attachment Having Light Source With Thermal Management", 7 pages.

Inforce APL White/IR Auto Pistol Light User Manual and Warranty; date Unknown; 2 pages.

Steiner-Optik Technical Manual, DBAL-PL, Tactical Pistol Laser/Light, date Unknown; 4 pages.

* cited by examiner

DETERRENT DEVICE ATTACHMENT HAVING LIGHT SOURCE WITH THERMAL MANAGEMENT

CROSS-REFERENCE TO RELATED APPLICATIONS

This application is a continuation of and claims priority to U.S. patent application Ser. No. 17/971,371 filed Oct. 21, 2022, titled "Deterrent Device Attachment Having Light Source With Thermal Management," which is a continuation of and claims priority to U.S. patent application Ser. No. 16/195,115, filed Nov. 19, 2018, titled "Deterrent Device Attachment Having Light Source With Thermal Management," which is a continuation of U.S. patent application Ser. No. 14/665,775, filed Mar. 23, 2015, titled "Deterrent Device Attachment Having Light Source With Thermal Management," now U.S. Pat. No. 10,132,485, which claims priority to U.S. Provisional Application No. 61/939,757, filed on Feb. 14, 2014, the entirety of which are all incorporated herein by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION FIELD OF THE INVENTION

The present invention relates to deterrent devices and attachments for deterrent devices having a portable light source and in particular to a portable light source having thermal management systems.

DESCRIPTION OF RELATED ART

With recent advances in solid state lasers and light emitting diodes, it has become possible to provide small but powerful light sources in the form of stand-alone devices such as flashlights and strobes. Additionally, it has become increasingly possible to integrate such small powerful light sources into other products.

A particular challenge in this area is that of providing a high powered light emitter within a deterrent device such as firearm or non-lethal weapon system. This is because, in general, bright illumination is desirable to ensure accuracy in aiming the device. It will be appreciated however that one challenge presented by such solid state light sources is that they generate a substantial amount of heat. If this heat is allowed to build up near the solid state light source, the heat can damage the solid state light source, the electrical interconnects between the light source and a driving circuit or the driving circuit itself. Additionally, such solid state light emitters are frequently less efficient when operated at elevated temperatures.

Heat sinks are used in conventional light sources to receive and to dissipate the heat generated by solid state light sources. Such heat sinks conventionally take the form of a mass of a thermally conductive material such as a metal. For example, U.S. Pat. No. 7,633,229 describes a drop-in light emitting diode module, reflector and flashlight including the same. As is shown in the '229 patent a metal ring is used as a heat sink. This metal ring adds significant mass to a flashlight that incorporates the same. In another example, described in U.S. Pat. No. 7,309,147 a heat sink is shown which is constructed from a conductive material such as aluminum that secures the solid state light emitter within a flashlight. The heat sink includes threads on an exterior portion thereof that engage threads of the flashlight head to secure the heat sink within the head of the flashlight. A bore traverses the heat sink from a first end to a second end thereof. The bore permits the insertion of the LED into the heat sink such that the heat sink substantially completely surrounds the LED assembly.

It will be appreciated that such heat sinks add significant mass and volume to the flashlight or other product into which solid-state lighting is incorporated. This can disrupt the balance of such deterrent devices and create inertial loads when such deterrent devices are manipulated that can cause difficulties in operating such devices. Additionally, such heat sinks can increase the cost and complexity of such devices.

While such metal heat sinks rapidly absorb heat from the solid state light source, this has the effect of increasing the temperature of the heat sink. As the temperature of the heat sink increases, the rate at which heat transfers from the light source into the heat sink slows. This allows temperatures at the light source to rise.

To prevent this, the heat sink is positioned against other structures in the light emitting device so that heat will be conducted into these other structures and dissipated. This helps to cool the heat sink. Some of these other structures may be in direct or indirect contact with the environment into which such heat can be dispersed. For example, the ring of the '147 patent is positioned against an outer housing of the flashlight so that heat from the heat sink can transfer into the outer housing and dissipate from there into the environment.

Another significant problem with this approach is that heat does not transfer through still air efficiently. Accordingly, for example, the '147 patent suggests the use of thermally conductive adhesives the help transfer heat.

Other approaches to managing heat in a solid state light emitting device are known. For example, actively cooled systems that encourage cooling air movement within or around the light emitting device have been proposed. Two examples of this type include a fan system described in Chinese Patent Publication 201124696 and a sonic vibration system described in Chinese Patent Publication 20112326337. However such active systems draw energy from portable power supplies and reduce the amount of time that a portable solid state light emitting device can be used before recharging. Such active systems also increase the size, weight and complexity of such a portable solid state light emitting device. Additionally, such active cooling systems generally reduce the overall efficiency of the solid state light emitting device and any device that they integrated into.

Approaches such as the large metal mass heat sink or active cooling systems are not always practical for use in many integrated light source applications and they are particularly counterproductive when applied to deterrent devices as these approaches unnaturally increase the size, weight, balance of the deterrent device or otherwise modify the shape, size or weight of the deterrent device in ways that create a risk that the deterrent device will be difficult to access or manipulate thus offsetting the aiming advantages obtained from the use of the deterrent device having the integrated light source.

What is needed therefore is a light source that is capable of generating high intensity light, that is capable of being integrated into a deterrent device and that is further capable of managing the heat generated by operation of the light source without compromising function or usability of the deterrent device.

SUMMARY OF THE INVENTION

Deterrent device attachments are provided. In one aspect a deterrent device attachment has a housing with an open area defined by area walls and an end wall having a segment through which light can pass, a support board having a metal layer with a first bend between a first end portion and a support portion and a light source that generates light and heat when energized. The light source is positioned in contact with the support portion. A drive circuit is adapted to controllably energize the light source. The support board is positioned at least in part between at least two of the area walls. The support portion is arranged to direct light generated by the lights source toward the opening with the first end portion extending away from the segment at least in part in a direction along one of the area walls with the metal layer providing a first boundary free area along which the heat can spread from the light source and be dissipated.

DETAILED DESCRIPTION OF THE DRAWINGS

Figure 1:
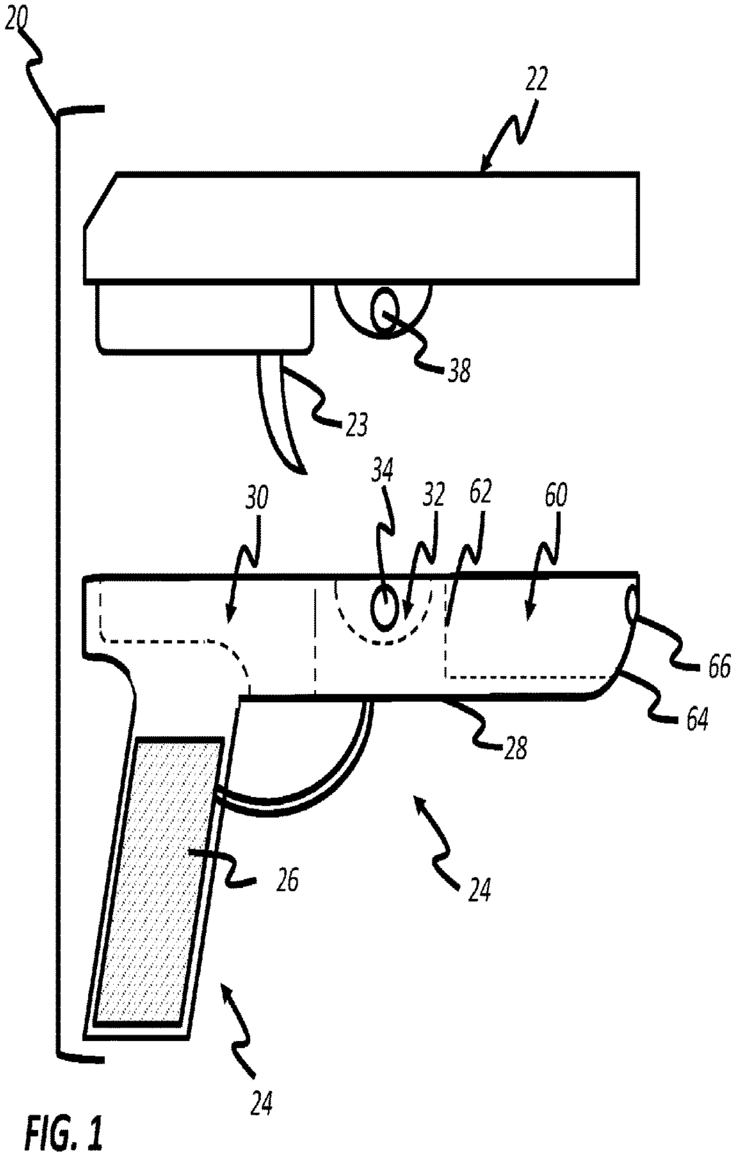
FIG. 1 is a side assembly view of one embodiment of a deterrent device.
Figure 2:
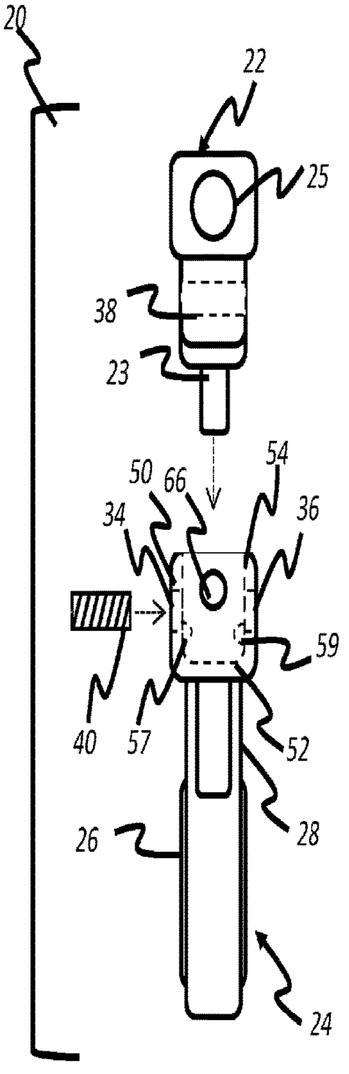
FIG. 2 is a front assembly view of the embodiment of FIG. 1.

FIGS. 1 and 2 respectively are side and front assembly views on embodiment of a deterrent device 20 having an integrated electronic apparatus 100. In this embodiment, deterrent device 20 comprises a firearm assembly 22 and a separable attachment 24. In the embodiment of FIGS. 1 and 2, firearm assembly 22 comprises all of the components necessary to enable a bullet (not shown) to be discharged from a barrel 25 of firearm assembly 22 when a trigger 23 is moved while separable attachment 24 provides a handle surface 26 to help aim and otherwise manipulate a firearm assembly 22 when separable attachment 24 is joined thereto.

In the embodiment that is illustrated, separable attachment 24 has a handle housing 28 with recessed areas 30 and 32 and into which firearm assembly 22 can be positioned. When firearm assembly 22 is positioned in recessed areas 30 and 32, openings 34 and 36 in handle housing 28 align with a passageway 38 in firearm assembly 22 into which a screw 40 or other fastener can be located in order to hold firearm assembly 22 and separable attachment 24 together. Firearm assembly 22 and separable attachment 24 can be joined together in other ways.

Similarly, housing 28 can have a shape that conforms to a shape of an external surface of a deterrent device so as to enable reliable mounting to the deterrent device. One example of such a shape is one that can be assembled to a trigger guard or handle of a deterrent device such as is found in the Centerfire brand of laser aiming devices sold by LaserMax, Inc. Rochester, NY, U.S.A.

As is also shown in FIGS. 1 and 2, handle housing 28 includes area walls 50, 52 and 54 around an open area 60. In this embodiment, firearm assembly 22 and handle housing 28 are defined so that when firearm assembly 22 and separable attachment 24 are joined together firearm assembly 22 combines with area walls 50, 52 and 54 to define sides of open area 60. Open area 60 is further defined by an internal end wall 62 and an external end wall 64. External end wall 64 has a light passage segment 66 through which light can pass. Light passage segment 66 can comprise for example and without limitation, an opening in external end wall 64, a transparent area of external end wall 64 and/or an area having an optical element such as a lens formed or provided therein.

Figure 3:
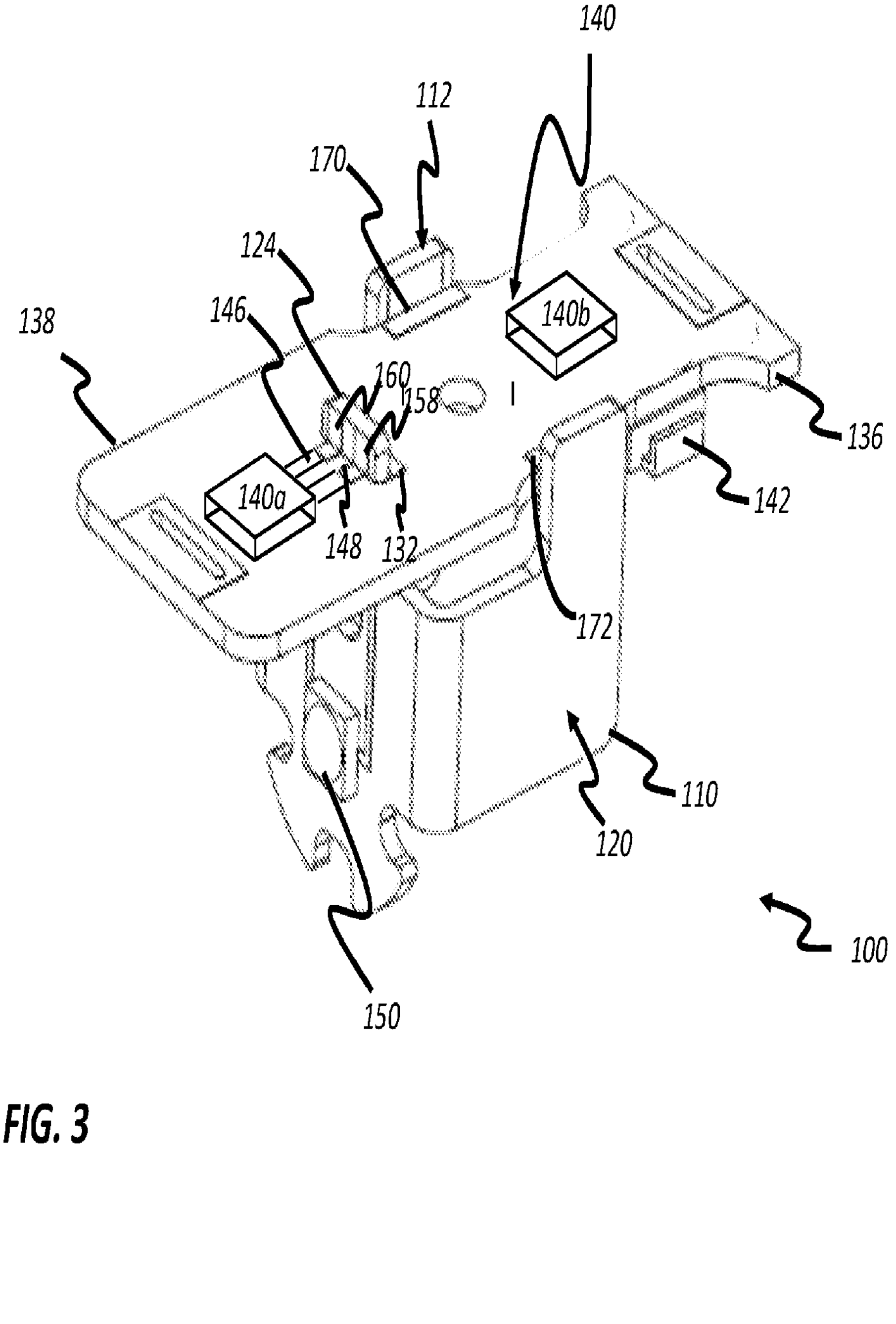
FIG. 3 is a right, top, front isometric view of a first embodiment of a light emission apparatus capable of integration into the deterrent device of FIG. 1.

FIG. 3 shows perspective view of a first embodiment of an electronics assembly 100 of attachment 24. As is shown in FIG. 3, electronics assembly 100 comprises a support board 110 on which a thermal source 150 is positioned and a drive board 130 on which a drive circuit 140 is positioned.

Figure 4:
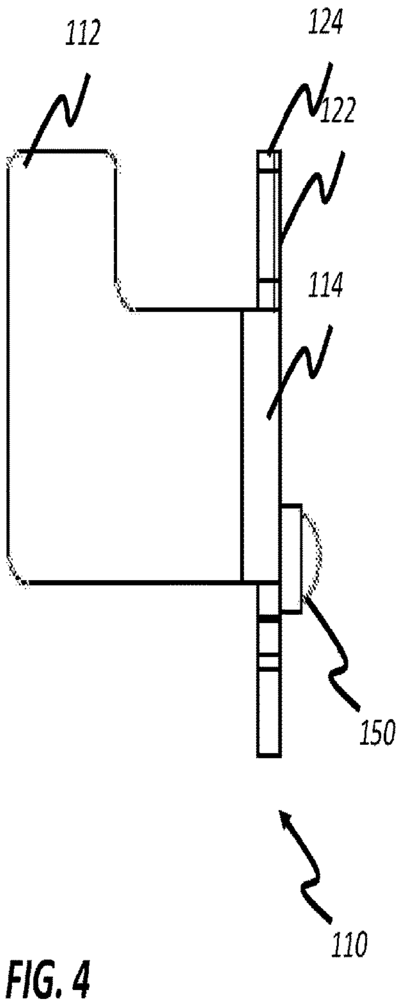
FIG. 4 is a left side view of a support board of the light emission apparatus of FIG. 3.
Figure 5:
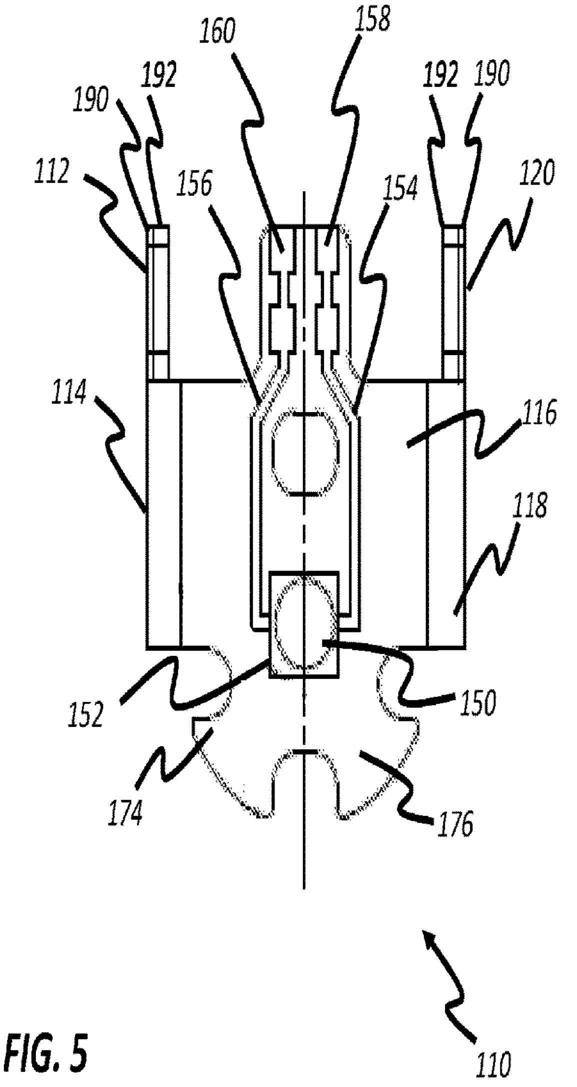
FIG. 5 is a front view of the support board of FIG. 4.

FIGS. 4 and 5 show side and front views of support board 110. As is shown in FIGS. 4 and 5, support board 110 has a first bend 114 between a first end portion 112 and a support portion 116 and a second bend 118 between support portion 116 and a second end portion 120.

In the embodiment of FIGS. 3, 4 and 5, thermal source 150 is a light source that generates light and heat when energized and can comprise for example and without limitation a light emitting diode or combination of light emitting diodes, a laser diode, a laser gain medium, a quantum dot light source or any other known light emitter. In the embodiment illustrated, thermal source 150 has a base 152 with two electrical paths 154 and 156 extending therefrom. Electrical paths 154 and 156 travel along a first side 122 of support board 110 to a tab portion 124 of support board 110 and terminate at contacts 158 and 160 respectively.

Figure 6:
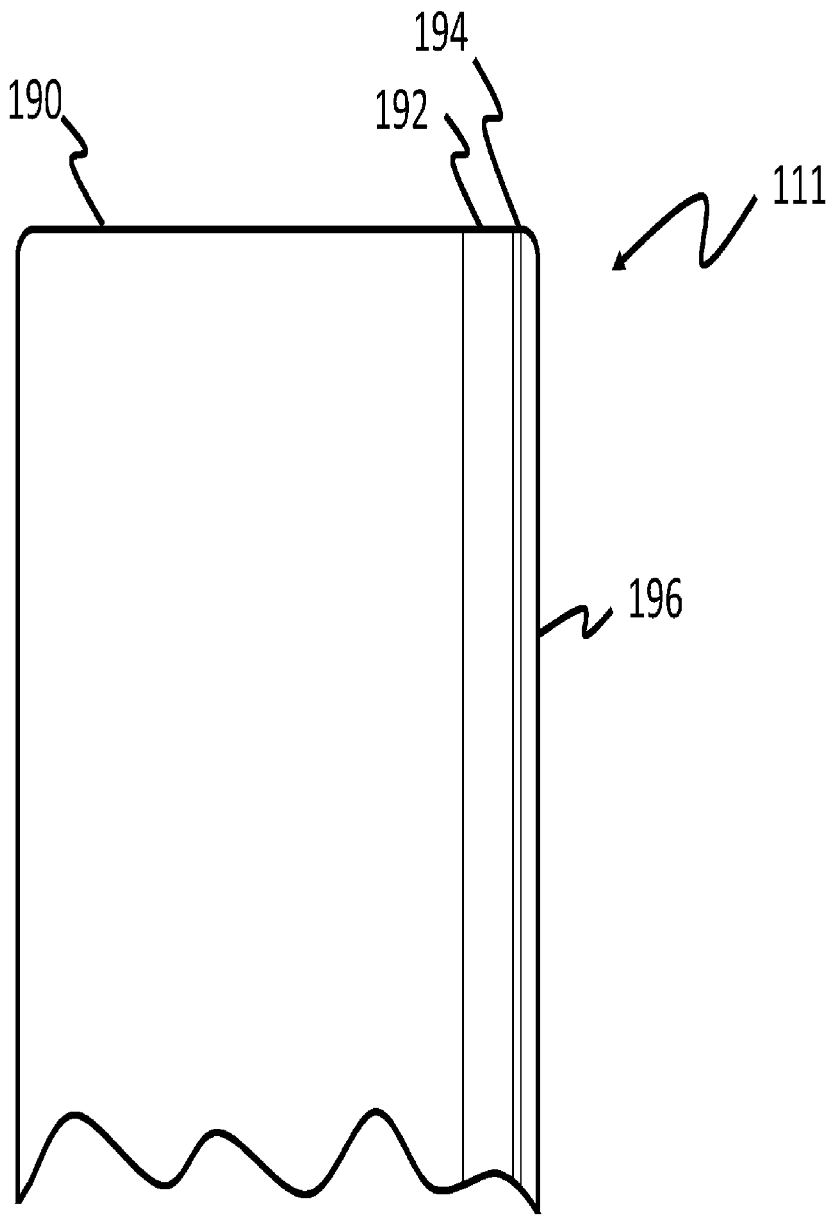
FIG. 6 is a cutaway side view of a metal clad board of a type that can be used to form a support board.

FIG. 6 is a cutaway side view of a metal clad board 111 of a type that can be used to from support board 110. In the embodiment of FIG. 6, metal clad board 111 has a metal base layer 190 formed from a copper or aluminum and is, in this embodiment, about 1.5 mm thick. However, in other embodiments, metal base layer 190 can be for example between about 0.3 mm to 2.5 millimeters thick. A first electrically insulating layer 192 is formed on metal base layer 190 and has a thickness of about 125 microns. In other embodiments, first electrically insulating layer 192 can have other thicknesses. A conductor layer 194 is provided on the first electrically insulating layer 192 and is electrically insulated from metal base layer 190 by first electrically insulating layer 192. In this embodiment conductor layer 194 has a thickness of about 13 microns and can range for example between 5 and 20 microns in thickness.

Using this embodiment of a metal clad board 111, electrical paths 154, 156, and contacts 158 and 160 can be formed by etching copper from conductor layer 194 and, after etching, another insulator such as paint or other material is applied. In one embodiment paint can be applied that has a thickness of about 75 to 80 microns. Other types of metal clad boards 111 can be used. Alternatively, any metal sheet can be used on which an insulated conductor can be formed such as by printing, screen printing or coating processes or on which an insulated conductor can be joined, mounted or bonded thereto.

Returning to FIG. 3, drive board 130 is shown with a drive circuit 140 illustrated conceptually as a combination of drive circuit components 140*a* and 140*b*. Drive circuit components 140*a* and 140*b* can take the form of any circuit know to those of skill in the art for converting power stored in a power supply (not shown in FIG. 3) into a supply of electrical energy that is of a type that is required to energize thermal source 150.

In the embodiment that is illustrated in FIG. 3, drive circuit 140 includes at least one activation switch 142 that can be actuated by a user to signal that the user desires to change a state of activation of a drive circuit 140. In one embodiment, actuation of the activation switch causes drive circuit 140 to transition between energizing thermal source 150 and not energizing thermal source 150. Other types of activating switches, such as multi-position switches, slide switches, and other sensors and systems known in the art can be used for activation switch 142. In one embodiment, driver circuit 140 can energize solid thermal source 150 in a continuous mode where energy is supplied to maintain continuous light emission from thermal source 150. However, in other embodiments driver circuit 140 can energize thermal source 150 in a pulsed mode such that light is emitted from thermal source 150 on a periodic basis or such that the intensity of light emitted from thermal source 150 is varied between a higher and a lower level. In still other embodiments, driver circuit 140 can be operable in either of a continuous or pulsed mode.

Drive board 130 has an opening 132 through which tab portion 124 can be inserted orthogonally to the plane of the drive board. When this is done, contacts 158 and 160 are positioned proximate to terminals 146 and 148 respectively. Electrical paths are then formed between terminal 146 and contact 158 and, separately, between terminal 148 and contact 160. In the embodiment that is shown in FIGS. 3-5 this is done using conventional soldering techniques. This board-to-board soldering approach eliminates the need for board-to-board wire based connections reducing the cost and complexity of electronics assembly 100. Drive board 130 also has a hole 134 through which a fastener (not shown in FIG. 3) can be inserted.

Additionally, in this embodiment, support board 110 is sized, shaped and bent so that when support board 110 is joined to drive board 130, first end portion 112 is proximate a first lateral edge 136 of drive board 130 to allow a first mechanical connection 170 to be made bonding the first end portion 112 to a first lateral edge 136 of drive board 130. Similarly, support board 110 is sized, shaped and bent so that when support board 110 is joined to drive board 130, second end portion 120 is proximate a second lateral edge 138 of drive board 130 so that a second mechanical connection 172 can be made bonding second end portion 122 to a second lateral edge 136 of drive board 130.

Figure 7:
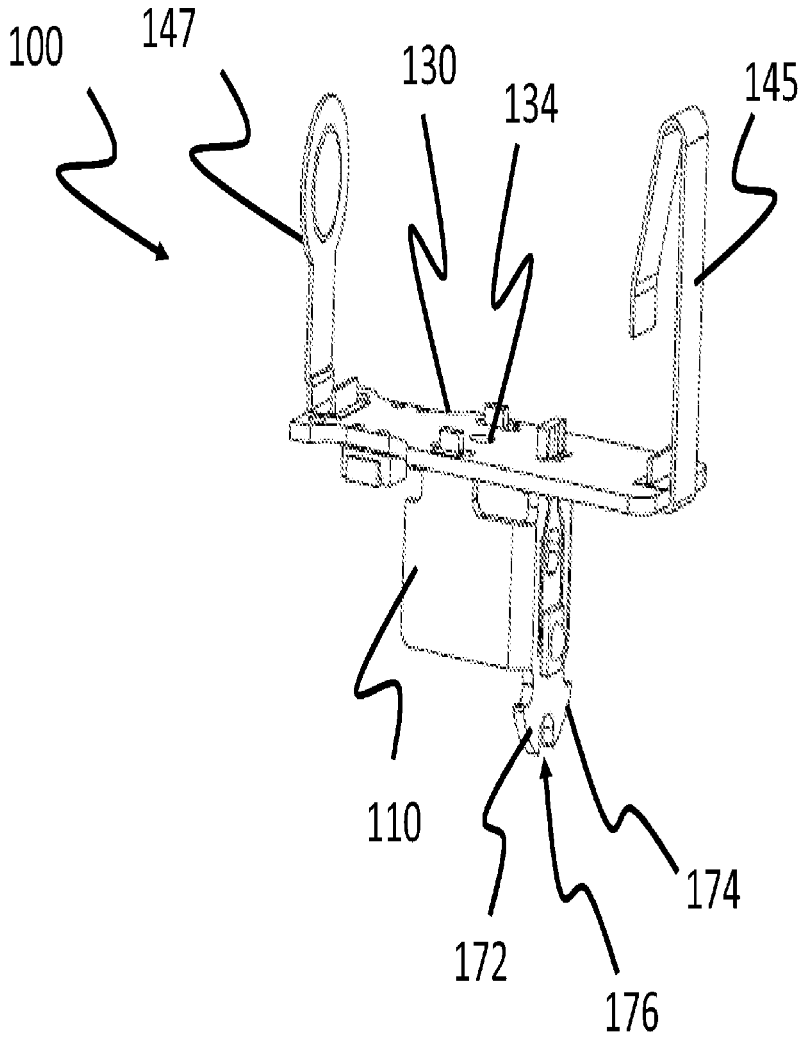
FIG. 7 shows a light source assembly manufactured outside of the deterrent device for modular assembly thereto.

This process joins support board 110 and drive board 130 at four different solder points, advantageously forming a relatively rigid structure. This, in turn, allows support board 110 and drive board 130 to be assembled into an electronics assembly 100 outside of open area 60 and then joined to battery leads 145 and 147 as is shown in FIG. 7. This can be done for example by way of soldering. The assembled support board 110, drive board 130, battery leads 145 and 147 can then be inserted into open area 60. Importantly, this is done without requiring that the entire module itself be packaged within some kind of containing enclosure such as a potting or conventional metal or plastic box. This lowers the weight, volume and cost of such a light emitting apparatus as compared to modular assemblies that require such potting or box and lowers manufacturing complexity by allowing assembly to occur outside of housing 28.

In the embodiment of FIGS. 3-7, support board 110 is positioned at least in part between area walls 50, 52, and 54 with support portion 116 and thermal source 150 are arranged to direct light generated by thermal source 150 toward the light passage segment 66 with the first end portion 112 and second end portion 120 extending at least in part away from light passage segment 66. In this embodiment, metal base layer 190 provides a boundary free path for heat that is generated by thermal source 150 to spread from thermal source 150 and be dissipated.

Figure 8:
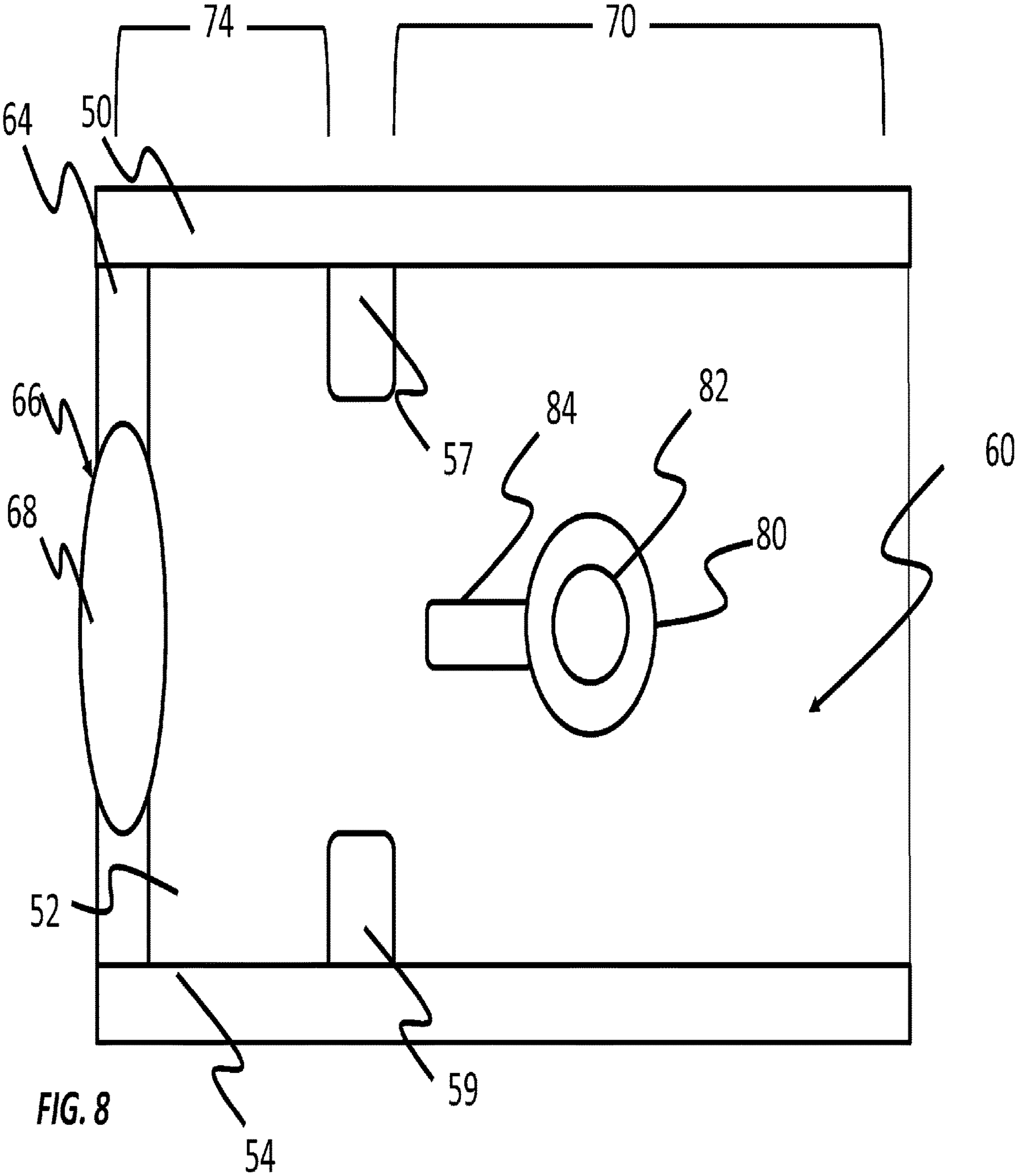
FIG. 8 shows a top down view of one example of an open area into which the light source assembly of FIG. 7 can be positioned.

FIG. 8 shows a top down view of one example of an open area 60 into which a modularly assembled support board 110 and drive board 130 can be assembled. In the example of FIG. 8, open area 60 includes a mesa 80 extending up from area wall 52 having an opening 82 and a support extension 84. Opening 82 permits a fastener such as screw to be threaded into mesa 80.

To facilitate such a modular assembly process, support board 110 is shown with optional capture ready insert forms 174 and 176 on a lower insert 178 portion thereof that can be inserted between optional capture surfaces 57 and 59 on area walls 50 and 54 as shown in FIGS. 2 and 7 to allow rapid and efficient modular assembly. Capture surfaces 57 and 59 have a shape that is complementary to the shape of insert forms 174 and 176. Such a modular combination of support board 110 and drive board 130 can additionally be joined to 24 at other points as desired. Other assembly features can be incorporated onto support board 110 or onto drive board 130 with mating features incorporated into open area 60. Alternatively conventional fasteners and adhesives can be used for such purposes. Similarly, in other embodiments, capture ready shaped insert forms 174 and 176 can be omitted in favor of such conventional fasteners or adhesives.

Figure 9:
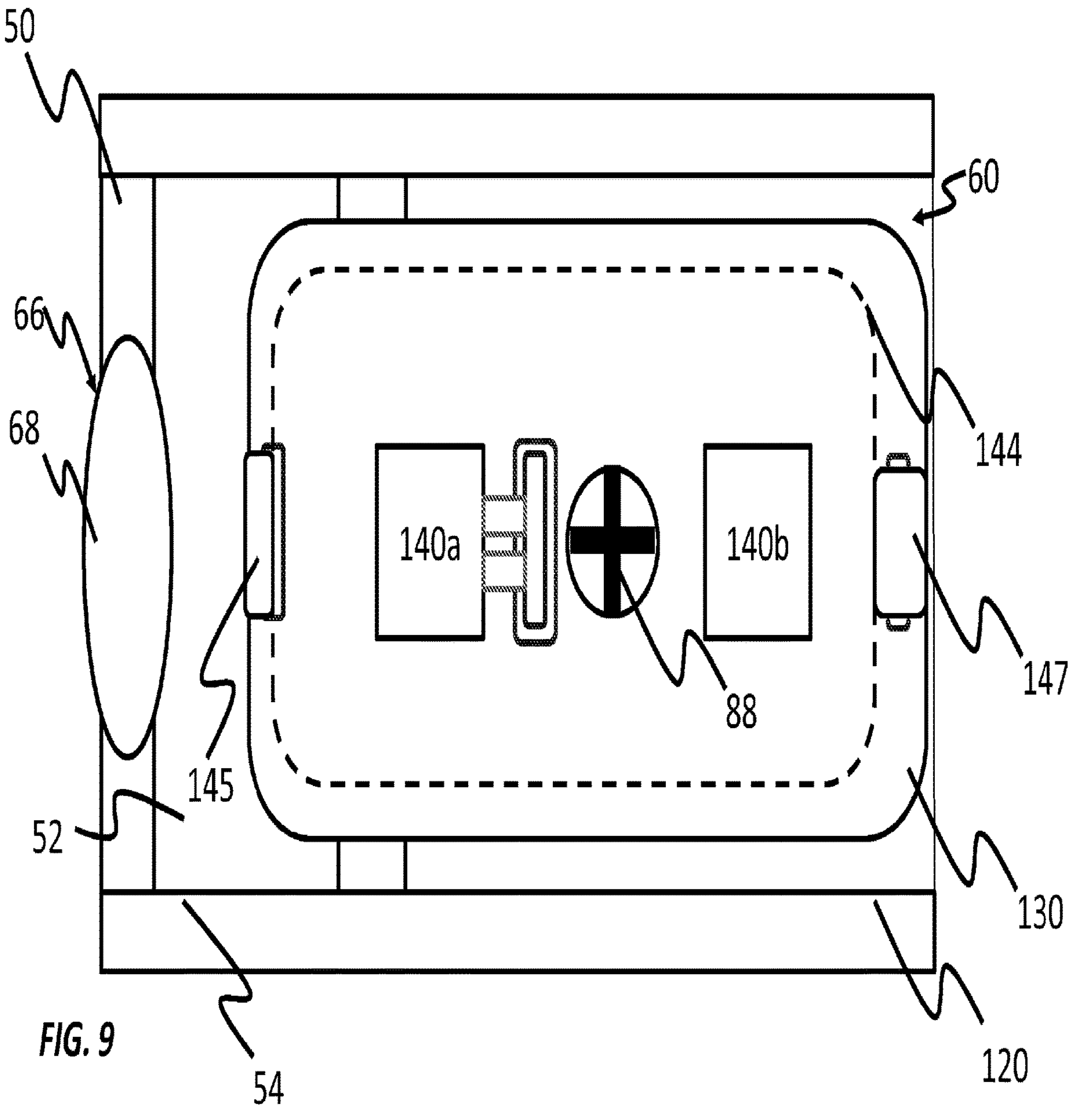
FIG. 9 shows a top down view of the open area of FIG. 8 with the light source assembly of FIG. 7 and a battery in the open area.

FIG. 9 shows at top down view of open area 60 with electronics assembly 100 positioned therein. As is shown in FIG. 9, fastener 88 is also optionally passed through hole 134 of drive board 130 to fasten drive board 130 and all other structures joined to drive board 130 to mesa 80. Also show in phantom in FIG. 9 is a battery 144 that is positioned between battery leads 145 and 147 to supply power to drive circuit 140 that drive circuit 140 can use to energize thermal source 150.

Figure 10:
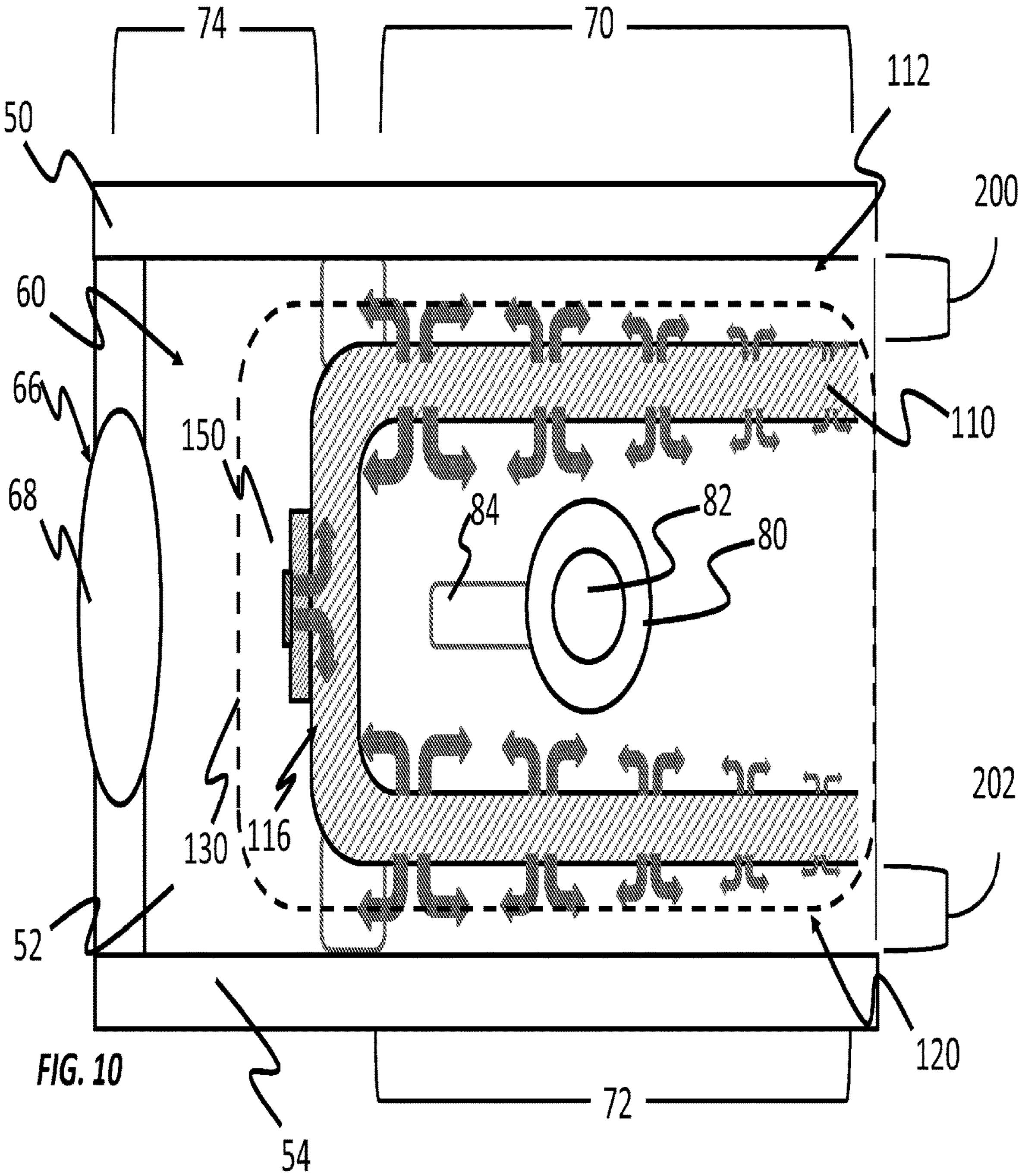
FIG. 10 shows a top down view of the open area of FIG. 8 with the drive board shown in phantom to illustrate the placement of the support board.

FIG. 10 is a top down view of the open area 60 after assembly with drive board 130 shown in phantom to illustrate the placement of support board 110. FIG. 10 illustrates, conceptually, the thermal advantages of support board 110. As is shown in FIG. 10, thermal source 150 is in contact with portions of support board 110 in support portion 116. This contact can be direct or indirect such as where substrates, coatings, intermediate mountings or other structures, articles or materials are used to help position, align, mount, bond, join or otherwise link thermal source 150 to support portion 116 in a way that does not substantially thermally insulate thermal source 150 from support portion 116. As is shown here, portions of support board 110 in support portion 116 absorb heat (conceptually illustrated as block arrows) as thermal source 150 emits such heat during operation. The heated support portion 116 transfers heat into first end portion 112 and second end portion 120 raising the temperature of first end portion 112 and second end portion 120. In the embodiment illustrated here, first end portion 112 is positioned proximate to area wall 50 and second end portion 120 is positioned proximate to an opposing area wall 54.

Accordingly, rather than using the prior art approach of first heating a heat sink located proximate to thermal source 150 and waiting for heat to transfer across a boundary from thermal source to some heat sink and then across another boundary between the heat sink and another heat dissipation mechanism, what occurs here is the rapid transfer of heat across through metal base layer 190 into a comparatively large surface areas at first end portion 112 and at second end portion 120 of support board 110. This comparatively large surface area enables support board 110 to more rapidly dissipate heat into adjacent materials despite any inefficiency in thermal transfer that may exist at the boundaries between the metal layer and adjacent materials.

As is generally illustrated in FIG. 10, in this embodiment, support board 110 is positioned apart from area wall 50 and area wall 52 such that air in separation areas 200 and 202 separate metal base layer 190 from area wall 50 and area wall 52. Air is not an efficient thermal conductor. Accordingly, the air in separation areas 200 and 202 limits the extent to which area walls 50 and 52 are heated by heat dissipated by support board 110. This may be advantageous for a variety of reasons such as for limiting the possible effects that thermal expansion of area wall 50 and area wall 52 might have on the relative positioning of thermal source 150 and then optional lens 68 in light transfer area 66.

It will be appreciated that, the inefficiency of air as a thermal conductor that makes it useful in limiting the extent to which area walls 50 and 52 are heated by makes it more difficult for support board 110 to effectively dissipate heat from thermal source 150 at a rate that is sufficient for use with thermal source 150. However, thermal transfer is a function of the surface area of the thermal radiator accordingly, by providing first end portion 112 and second end portion 120 that can have a surface area that can be defined that is sufficient to radiate a requisite amount of thermal energy from support board 110 per unit of time of operation of thermal source 150 to allow thermal source 150 and any other components of electronics assembly 100 to operate within a temperature range in which thermal source 150 and such other components of electronics assembly 100 emit light reliably and efficiently notwithstanding the heat generated by thermal source 150.

Figure 11:
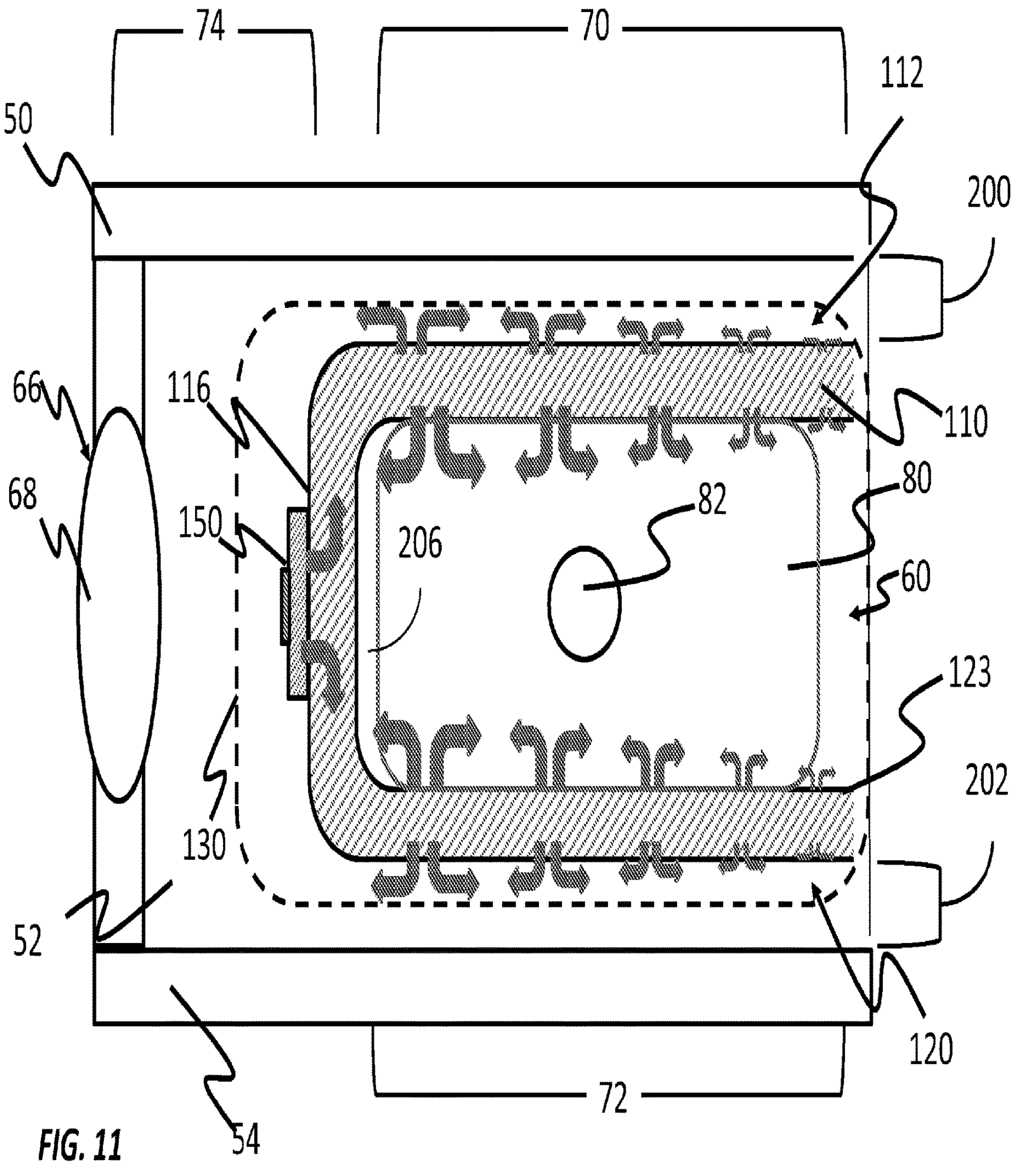
FIG. 11 shows a top down view of the open area of FIG. 8 with the drive board shown in phantom to illustrate the placement of the support board.

As is generally illustrated in FIG. 11, thermal energy or heat (shown as block arrow) generated by thermal source 150 flows into support board 110 and is conducted principally by metal base layer 190 (not shown in FIG. 11) However, as is illustrated here, contact between support board 110 air in separation areas 200 and 202 occurs across heat transfer surface areas that are defined by length 70 and 72 respectively. The comparatively large surface areas provided therein enable even inefficient thermal transfer into air at separation areas 200, 202 and in open area 60 can provide sufficient thermal dissipation without requiring active cooling solutions.

Additionally, it will be appreciated that this approach is readily extensible. That is, the capacity of electronics assembly 100 to dissipate heat over time can be increased by increasing the surface area of support board 110. Such increases can conveniently be provided by extending either or both of length 70 of first end portion 112 and length 72 of second end portion 120 of support board 110. In some embodiments, extending length 70 or length 72 can be done within the confines of open area 60 and in other embodiments extending lengths 70 or 72 can be done by extending either or both of first end portion 112 and second end portion 120 outside of open area 60 as will be described in greater detail below.

A further advantage of this approach is also illustrated in FIG. 11. As is shown in FIG. 11, in an embodiment where light passage segment 66 takes the form of a lens that is positioned in part by area walls 50 and 54 a risk exists that a length 74 between an optical element shown here as lens 68 forming part of light passage segment 66 and thermal source 150 can be increased by thermal expansion to move thermal source 150 away from lens 68. If too much movement of this type occurs, length 74 between thermal source 150 and lens 68 can become greater than a desired range of lengths within which an optical element such as lens 68 will have a planned on range of effects. For example, such thermal effects can cause thermal source 150 to move of a focus distance of lens 68.

However, as is generally illustrated in FIG. 11, using support board 110 it becomes possible to position heat dissipation in locations adjacent to portions of area walls 50 and 54 that are more removed from the portions of area walls 50 and 54 that define length 74 between light lens 68 and thermal source 150. Accordingly, to the extent that area walls 50 and 54 are heated by heat dissipated by support board 110, such heating in any resultant thermal expansion will principally occur in portions of area walls 50 and 54 that are less likely to create unwanted thermal expansion of area walls 50 and 54 in length 74 that defines the relative positions of lens 68 and thermal source 150. This reduces the extent of the risk that portions of area walls 50 and 54 between thermal source 150 and lens 68 will be heated enough to create focus problems. In particular, it will be noted that in the embodiment of FIG. 11, all heat transfer into area walls 50 and 54 occurs along portions of area walls 50 and 54 that are in areas that are not between thermal source 150 and lens 68. Accordingly, there is a reduced risk that thermal expansion of area walls 50 and 54 will cause unwanted optical effects in this embodiment.

In similar fashion, an air gap (not shown) can be left between area wall 52 and any or all of first end portion 112, support portion 116, and second end portion 120.

As is shown in FIG. 11, in another embodiment, mesa 80 can be defined that projects up from area wall 52 having a size and shape that allows, for example, a shaped mesa 80 to contact a second side 123 of support board 110 to allow direct thermal transfer from support board 110 into mesa 80. In the embodiment shown in FIG. 12, an optional air gap 206 is provided proximate support portion 116 of support board 110. This optional feature can be used where there is a risk that providing mesa 80 proximate to thermal source 150 will raise the temperature of support portion 116 to a level that is greater than desired for contact with materials forming mesa 80. Other structures can also be provided in open area 60 for such a purpose. It will be appreciated that here too the area for heat transfer between mesa 80 and first end portion 112 and second end portion 120 occurs over extended lengths to enable an overall rate of thermal transfer into mesa 80.

Figure 12:
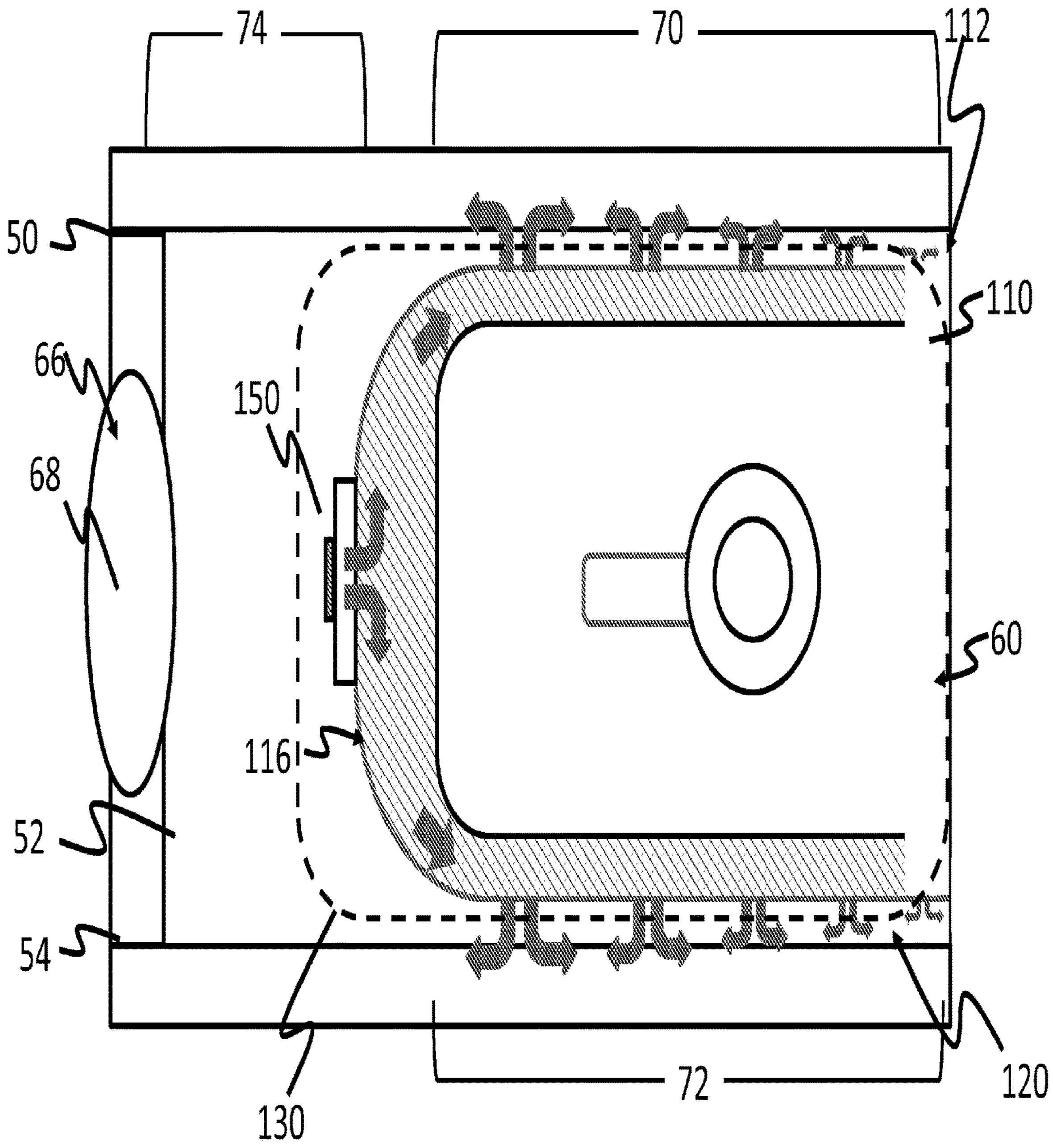
FIG. 12 is top view of another embodiment of a support board in an open area of a deterrent device.

FIG. 12 shows a top down view of another embodiment of a support board 110. In this embodiment, metal base layer 190 is thicker in support portion 116 so as to provide some degree of thermal buffering or heat sink capability near the source of heat. Here this is done by providing a region of metal base layer 190 in support portion 116 than in first end portion 112 and second end portion 120. As can be seen in FIG. 12, this thermal buffering or heat sink capability is provided without creating a heat transfer boundary between the heat sink and first end portion 112 and second end portion 120.

Thermal transfer from support board 110 and area walls 50 and 54 may be acceptable in certain embodiments. FIG. 12 illustrates this feature in addition to those features described above. Here too, support board 110 can be arranged so that first contact between first end portion 112 and area wall 50 and between second end portion 120 and area wall 54 occurs across broad surface areas along lengths 70 and 72. Further, lengths 70 and 72 can be arranged at places apart from length 74 within which area walls 50 separate a lens 68 from thermal source 150. This can reduce the risk that thermal dissipation from support board 110 into area walls 50 and 54 will cause length 74 to change in a manner that disrupts operation of electronics assembly 100.

Figure 13:
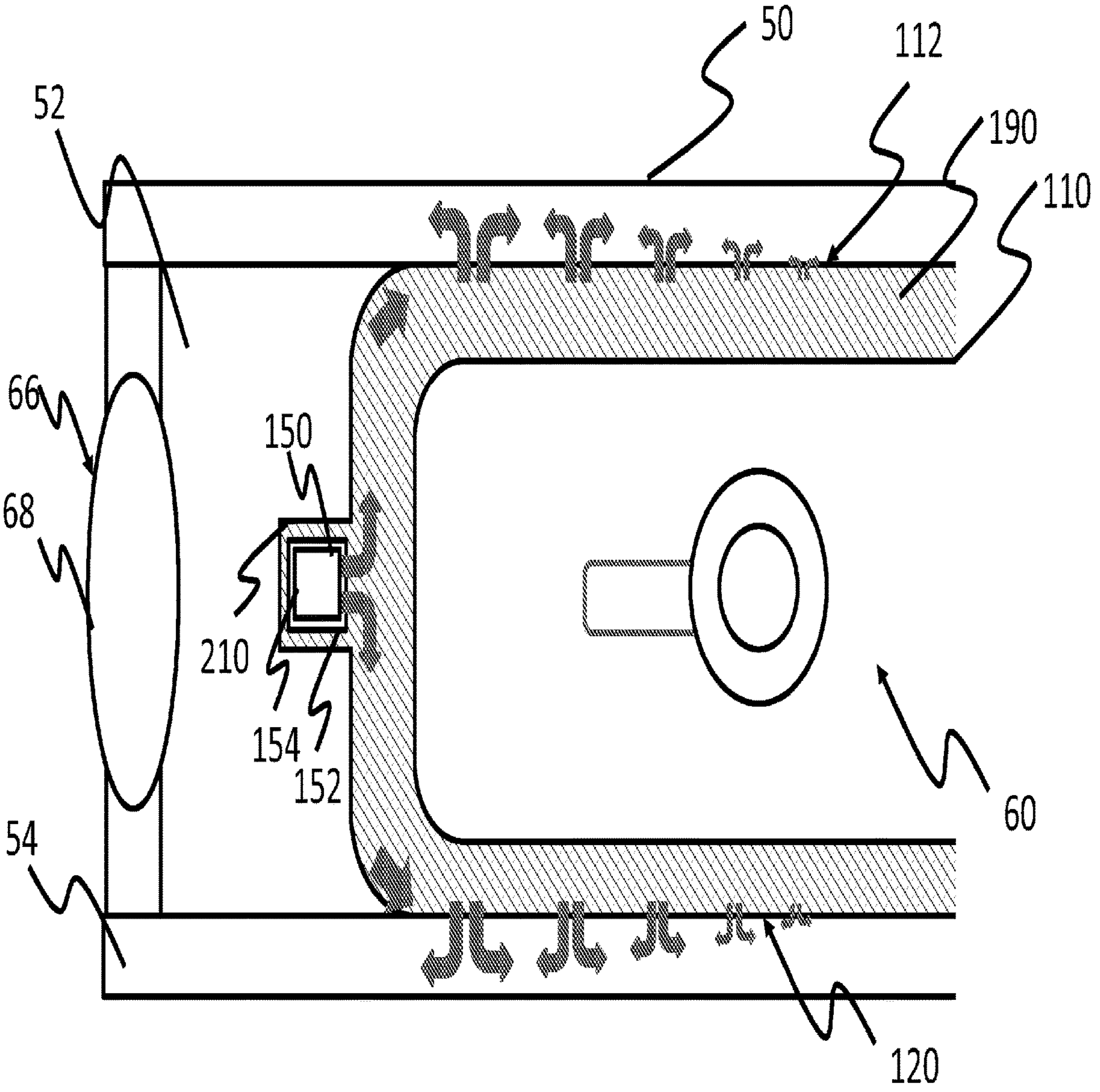
FIG. 13 is a top view of an embodiment of a support board adapted for use with an edge emitting solid state light source and located in an open area of a deterrent device.
Figure 14:
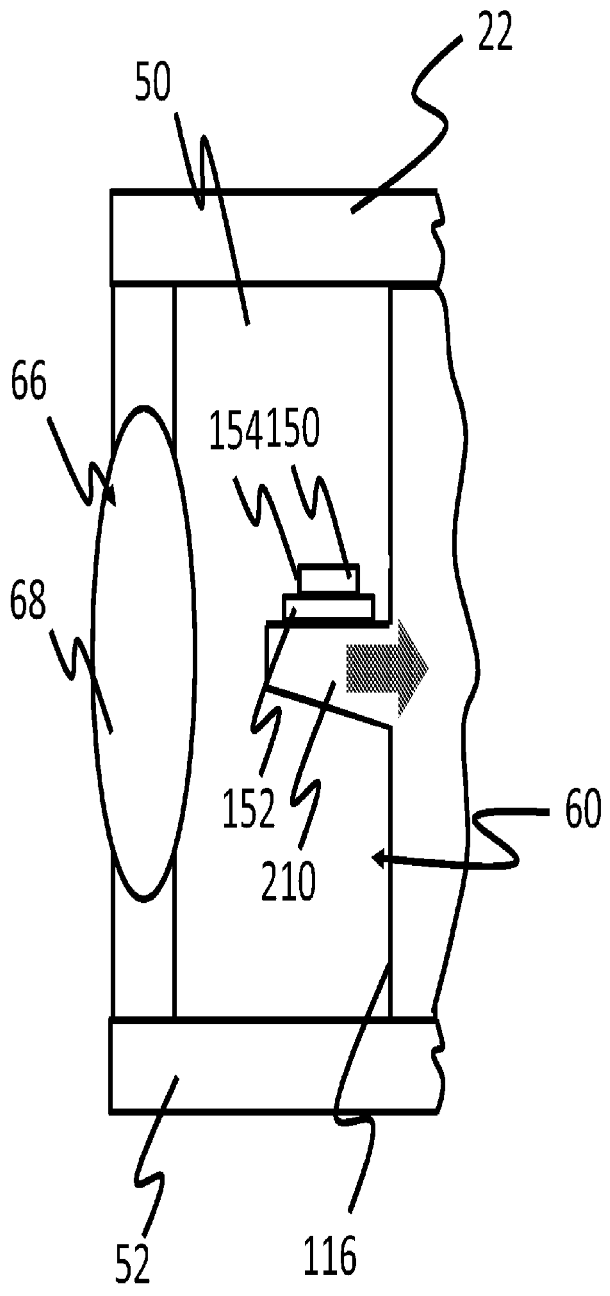
FIG. 14 is a cut away side view of the support board of the embodiment of FIG. 1 3.

FIG. 13 shows a top down view a thermal source 150 may be used that is of the type that emits light from an emission edge 155 thereof and, that therefore requires a platform 210 on which such an edge emitting thermal source 150 can be positioned to direct the emission face 155 toward light transmission area 66. FIG. 14 is a cut away side view of open area 60 as shown in FIG. 13 illustrating platform 210. Here too it will be observed that heat that is transferred from base 152 of thermal source 150 transfers into platform 210 and from there is distributed into metal base layer 190 at support portion 116 for distribution into first end portion 112 and second end portion 120 as described above without requiring that such heat pass through an additional material boundary. Also shown in this embodiment is the optional positioning of first end portion 112 and second end portion 120 against area walls 50 and 54 to enable direct thermal transfer into area walls 50 and 54. This can be done in embodiments where thermal transfer into area walls 50 and 54 will not disrupt proper operation of electronics assembly 100.

Figure 15:
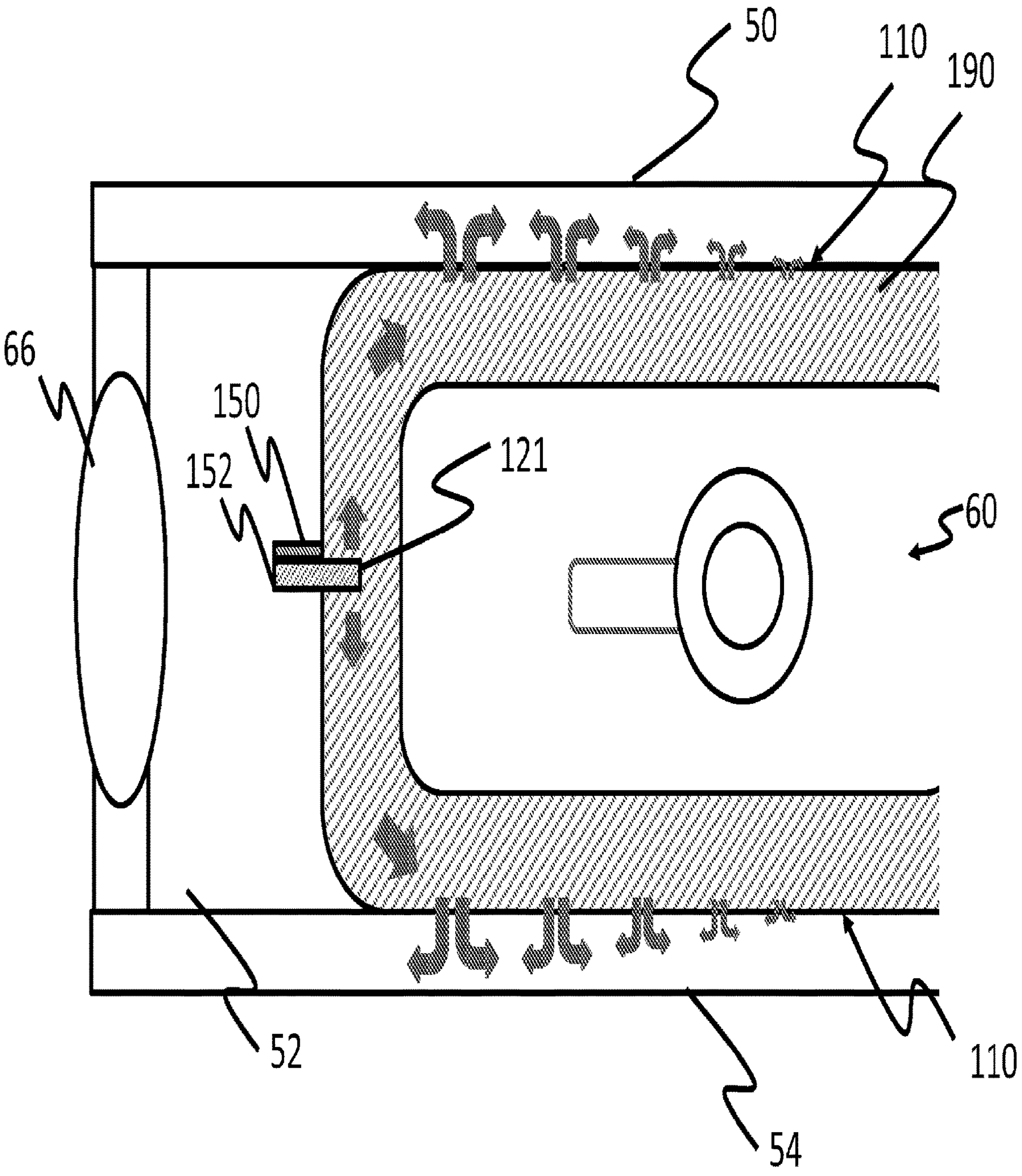
FIG. 15 illustrates another embodiment of a support board positioned in an open area of a deterrent device.

FIG. 15 illustrates another embodiment of a support board 110 positioned in an open area 60 of a deterrent device 20 wherein thermal source 150 has a base 152 that is joined to support board 110 by inserting base 152 into a recess 212 formed in support portion 116 of support board 110. This approach allows metal base layer 190 to receive heat directly from base 152 along multiple sides thereof and does not require the provision of a platform 200. Optionally, recess 204 can extend into support 192 to provide mechanical stability where necessary.

Figure 16:
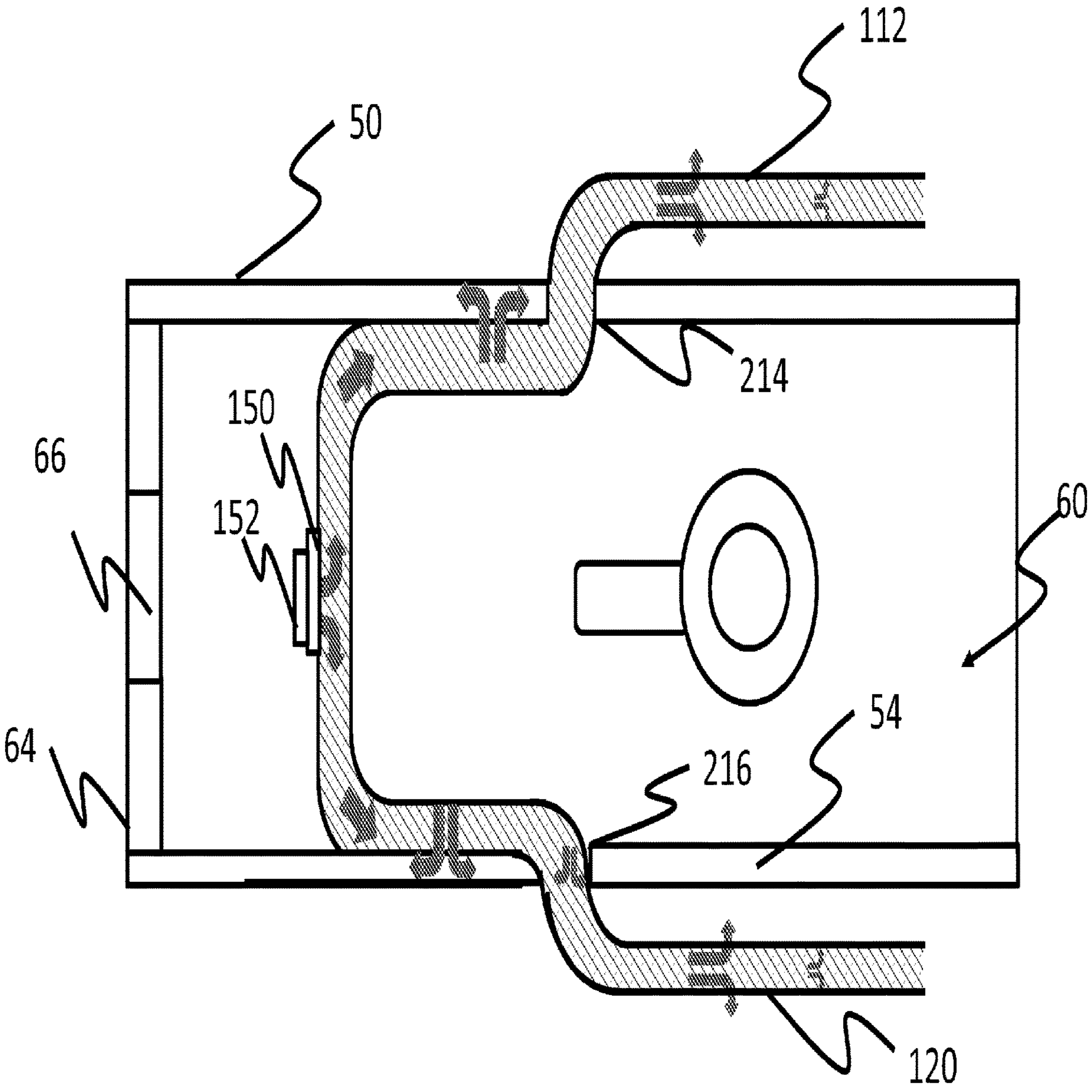
FIG. 16 shows a top down view of yet another embodiment of a support board located in an open area of a deterrent device and having a first end portion and second end portion that extend at least in part through openings to radiate heat into an area outside of the deterrent device.

FIG. 16 shows a top down view of yet another embodiment of support board 110 located in an open area 60 of a deterrent device. In this embodiment, a first end portion 112 and second end portion 120 extend at least in part through openings 214 and 216 in area walls 50 and 54 to provide a barrier free path for heat to flow from support portion 116 to areas outside of open area 60 where there is the possibility that greater ambient airflow, cooler temperatures or other factors that facilitate dissipation of heat. In such an embodiment first end portion 112 and second end portion 120 can be shaped to provide increased surface area such as by forming channels, v-patterns or other patterns known to those of skill in the art as increasing airflow in ways that are useful for heat dissipation.

Figure 17A:
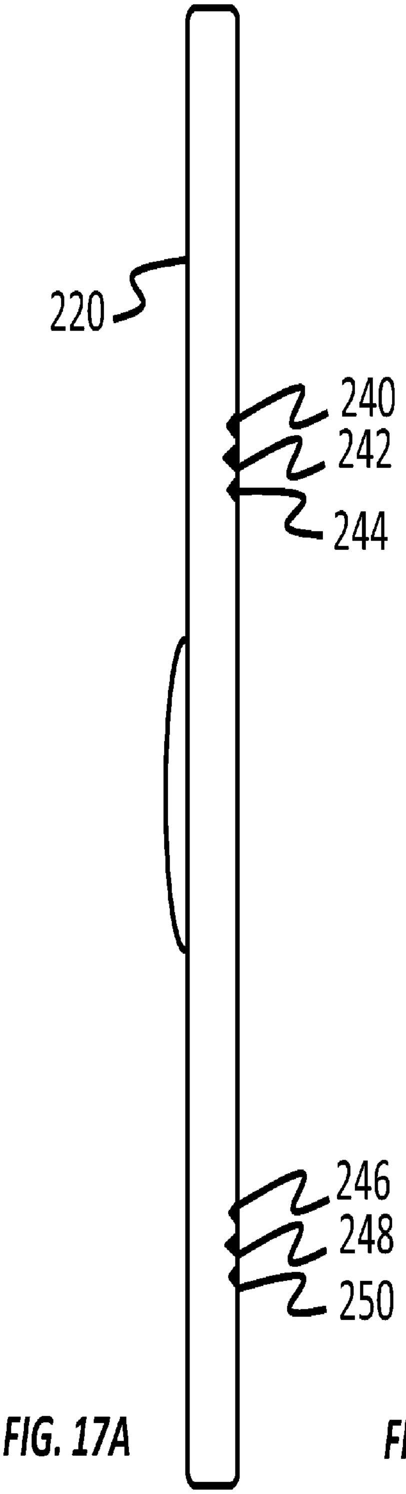
FIGS. 17A, 17B and 17C illustrate different extrusion profiles that can be used to make different embodiments of a support board.

Support board 110 can be manufactured or fabricated in any of a variety of different manners known to those of skill in the art of forming metal clad surfaces. For example, FIG. 17A illustrates a profile 220 that can be used for fabricating a support board 110 of the type that is illustrated generally in FIG. 12. In one example of this type a metal layer can be extruded according to this profile with other layers formed thereon after extrusion. Alternatively, a metal layer and other layers of a support board 110 can be co-extruded according to profile 220.

Figure 17B:
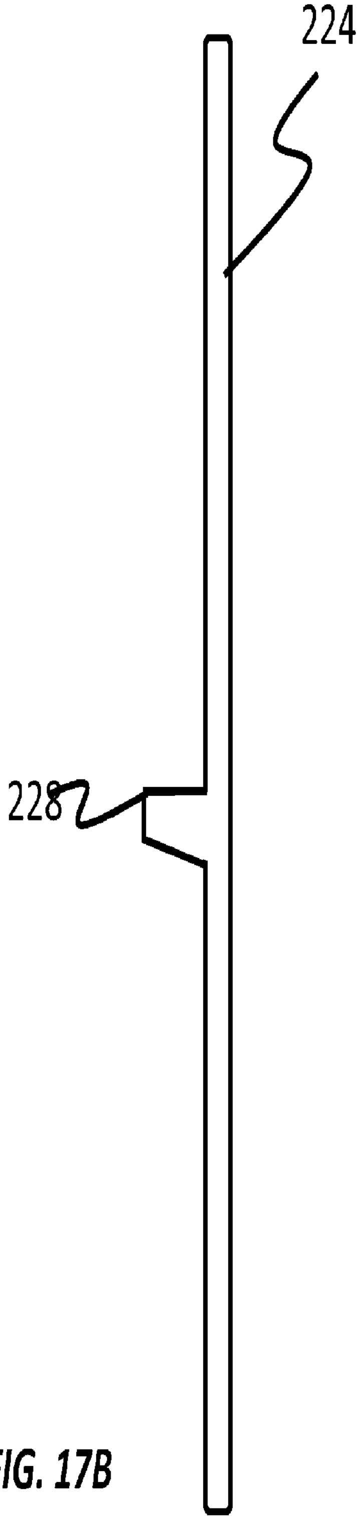

Similarly, as is shown in FIG. 17B a form 224 having a recess 228 for forming a support board 110 with an integral platform 200 such as is illustrated in FIGS. 13 and 14.

Figure 17C:
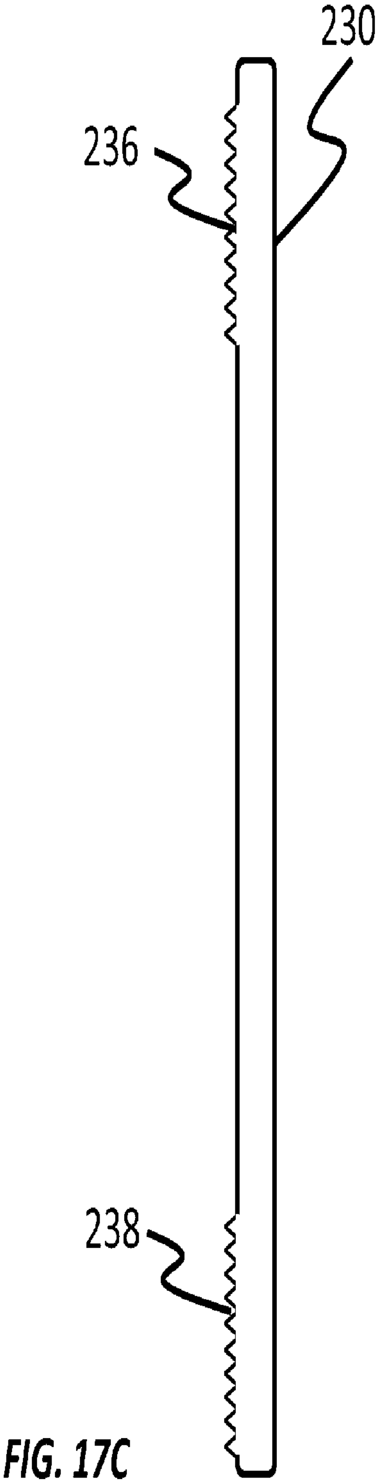

Other designs are possible. For example, FIG. 17C shows a profile 230 having recesses 236 and 238 that form relief features on a support board 110 that tend to increase the surface area of a support board (not shown in FIG. 17C) so as to increase the surface area of the support board made using profile 230. Profile 230 can be usefully applied to form a support board 110 for use in the embodiment of FIG. 16 where such increased surface area will be provided at a first end portion 112 and at second end portion 120 of a support board 110 formed using such profile 230 that can be used to help transfer heat from thermal source 150 into an environment surrounding deterrent device 20. Such additional surface area provided by such shapes can also be used in other embodiments as well.

Additionally as is shown in FIG. 17A, optional notches 240, 242, 244, 246, 248 and 250 can be provided in a substrate profile such as profile 222 to facilitate bending of a support board 110 so that support board can be bent to form first bend 114 and second bend 118 with improved precision and possible with improved control over positioning of bends formed in a support board 110 co-extruded in such a fashion. It will be appreciated that such benefits can be obtained in other embodiments by pre-scoring metal clad board 111 or other substrate used to form a support board 110.

It will be understood that while the forgoing has described the use of electronics assembly 100 in connection with a deterrent device, can be used into other types of devices including any other products into which what is described herein can be integrated and, in addition, standalone illumination devices such as portable or stationary lighting solutions, illuminators, designators, pointers, markers, beacons and the like. It will also be appreciated that the light emitted by light emitter 150 can be visible, infrared including near visible, short wave, mid-wave and long wave infrared, and ultraviolet light.

Figure 18:
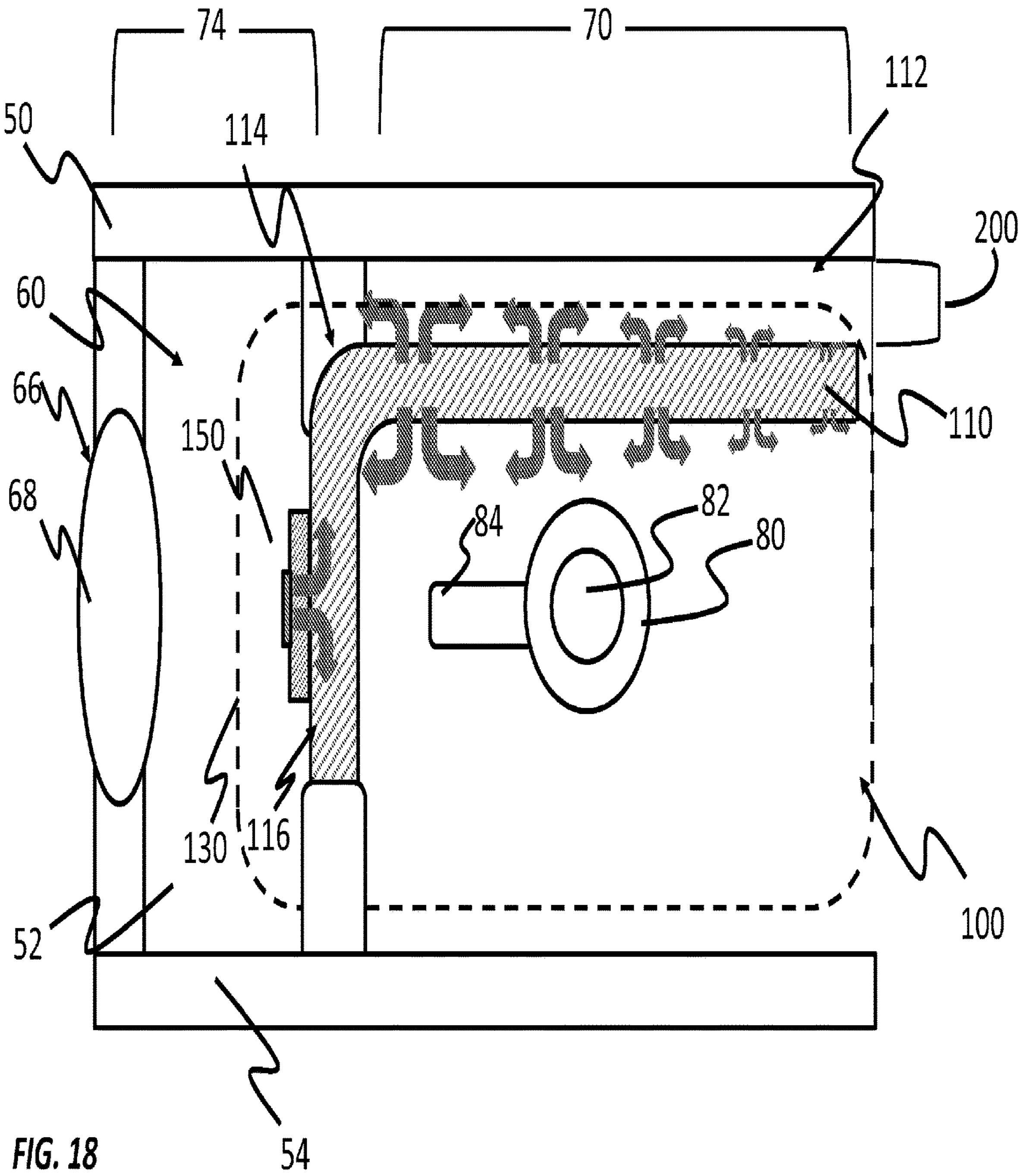
FIG. 18 is a top down view of an open area showing another embodiment of an electronics assembly having a support board that is assembled to a drive board.

FIG. 18 is a top down view of open area 60 of the embodiment of FIG. 9 and another embodiment of an electronics assembly 100 having a support board 110 that is assembled to a drive board 130 (shown in phantom to illustrate the placement of support board 110). In the embodiment of FIG. 18, electronics assembly 100 has a support board 110 having a metal layer with a first bend 114 between a first end portion 112 and a support portion 116. A thermal source 150 is joined to or otherwise in contact with support portion 116 and generates light and heat when energized. However, as is illustrated in FIG. 18, in this embodiment support board 110 has first end portion 112, a first bend 114 and a support portion 116 but does not have the second bend 118 and the end portion 120 found in the preceding embodiments.

FIG. 18 also illustrates, conceptually, the thermal advantages of this embodiment of support board 110. As is shown in FIG. 18, support portion 116 of support board 110 absorbs heat (conceptually illustrated as block arrows) as thermal source 150 emits such heat during operation. Heated support portion 116 transfers heat into first end portion 112 raising the temperature of first end portion 112. In the embodiment illustrated here first end portion 112 is positioned proximate area wall 50 and dissipates heat across a broad surface area along length 70. This embodiment of support board 110 can be used for example, and without limitation, for the purposes such as reducing the weight or cost of support board 110 or conforming support board 110 to particular configurations of open area 60. The broad surface area of first end portion 112 can be sized, for example, to provide a rate of thermal dissipation that is generally equal to or greater than a rate at which thermal source 150 introduces thermal energy into support portion 116 of support board 110 or at some of the rate sufficient to support operation of thermal source 150 over a desired runtime or duty cycle.

Figure 19:
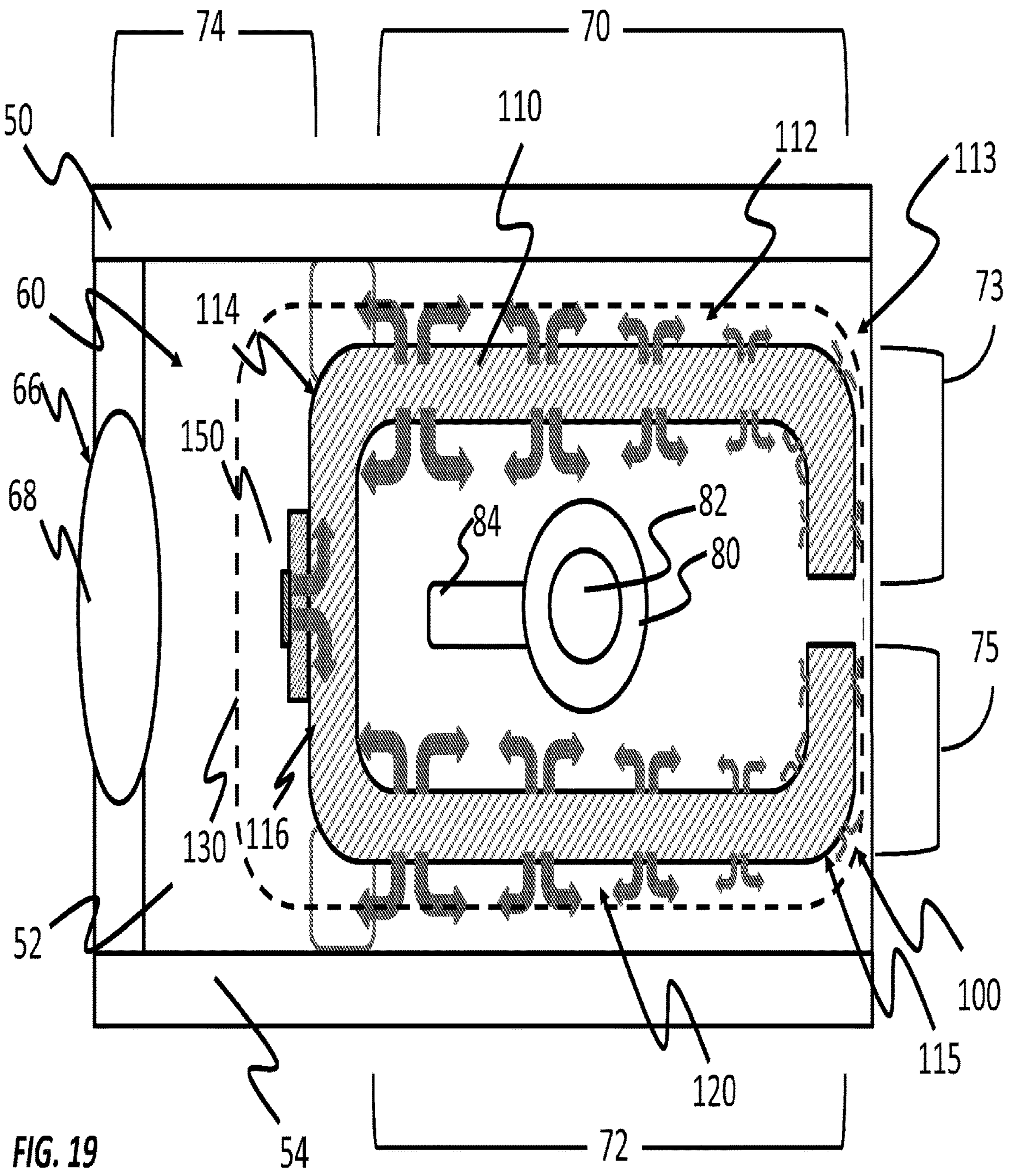
FIG. 19 is a top down view of an open area showing another embodiment of an electronics assembly having a support board that is assembled to a drive board.

FIG. 19 is a top down view of open area 60 of the embodiment of FIG. 19 having an embodiment of an electronics assembly 100 having another embodiment of a support board 110 that is assembled to a drive board 130 (shown in phantom to illustrate the placement of support board 110). In the embodiment of FIG. 19, support board 110 has a metal layer with a first bend 114 between a first end portion 112 and a support portion 116. A thermal source 150 is joined to support portion 116 and generates light and heat when energized. As is shown in FIG. 19, support portion 116 of support board 110 absorbs heat (conceptually illustrated as block arrows) as thermal source 150 emits such heat during operation. Heated support portion 116 rapidly transfers heat into first end portion 112 and second end portion 120 rapidly raising the temperature of first end portion 112 and second end portion 112.

In the embodiment illustrated here first end portion 112 extends in a first direction and dissipates heat across a broad surface area along length 70. Additionally, in this embodiment, first end portion 112 has a first end bend 113 allowing first end portion 112 to additionally extend in a second direction such that the surface area for heat dissipation provided by first end portion 112 extends along a length that is defined by length 70 plus an additional length 73. Similarly, in this embodiment second end portion 120 has a second end bend 115 allowing second and a portion 122 extend in a different direction such that the surface area provided by second end portion 120 extends along a length that is defined by length 72 plus an additional length 75.

In the embodiment that is illustrated here, first end bend 113 and second and bend 115 are configured to bend first end portion 112 and second end portion 120 into open area 60 so as to provide additional surface area for thermal dissipation within open area 60. Other arrangements are possible that do not bend into open area 60. For example and without limitation one of lengths 70 and 72 can be shorter than the other so that bends 113 and 115 are staggered so that first end portion 112 and second end portion 120 are bend to form an interleaving arrangement in open area allowing lengths 73 and 75 to be longer.

This embodiment of support board 110 can be used for example, and without limitation, to provide enhanced surface area for thermal dissipation within open area 60 or conforming support board 110 to particular configurations of open area 60. Here too, the broad surface area of first end portion 112 and second end portion 120 can be sized, for example, to provide a rate of thermal dissipation that is generally equal to or greater than a rate at which thermal source 150 introduces thermal energy into support portion 116 of support board 110 or at some of the rate sufficient to support operation of thermal source 150 over a desired runtime or duty cycle.

In the embodiments described above, thermal source 150 has been described as being a light emitter. However, in other embodiments thermal source 150 can comprise other types of devices that generate heat including semiconductor devices such as microprocessors, imagers, transformers or other circuits or systems that generate heat either for a functional purpose or as a byproduct of a functional purpose. In one embodiment, thermal source 150 can comprise a temperature regulator such as thermo-electric cooler that is operated to provide a cooled surface and a heated surface with the heated surface being joined to support portion 116. In these embodiments, drive circuit 140 can be adapted to drive or control operation of such other thermal sources 150 using any known circuits or systems for controlling such other types of thermal sources 150.

The drawings provided herein may be to scale for specific embodiments however, unless stated otherwise these drawings may not be to scale for all embodiments. All block arrow representations of heat flow are exemplary of potential thermal patterns and are not limiting except as expressly stated herein.

The invention has been described in detail with particular reference to certain preferred embodiments thereof, but it will be understood that variations and modifications can be effected within the spirit and scope of the invention.

The invention claimed is:

1. A deterrent device attachment, comprising:

a housing having an open area defined by area walls and an end wall having a segment through which light from a light source can pass; and an electronics assembly having:

a support board positioned apart from the area walls to limit heat transfer from the support board to the area walls, a light source in contact with portions of the support board, wherein:

the contact enables a heat transfer from a heated portion of the support board positioned in proximity to the light source to a first end portion and a second end portion of the support board, and the first end portion and the second end portion are configured to dissipate heat generated away from the light source, and a drive board on which a drive circuit is positioned, the drive circuit configured to controllably energize the light source.

2. The deterrent device attachment of claim 1, wherein the first end portion and the second end portion have a surface area configured to radiate thermal energy from the support board to allow the light source and the electronics assembly to maintain an operating temperature range within a predetermined range.

3. The deterrent device attachment of claim 1, wherein the light source comprises a thermal source.

4. The deterrent device attachment of claim 1, wherein the support board includes a first surface, and the drive board includes a second surface coupled to the first surface, the second surface being coupled to the first surface at a location outside of the open area to enable the support board and the drive board to be inserted as an assembly into the open area in the housing.

5. The deterrent device attachment of claim 1, wherein the electronics assembly comprises at least two terminals positioned proximate to an opening of the drive board, wherein the at least two terminals are electrically coupled such that energy passes from the drive board to the light source.

6. The deterrent device attachment of claim 1, wherein the support board is configured so that the first end portion is proximate an edge of the drive board, and the first end portion is coupled to the drive board.

7. The deterrent device attachment of claim 1, wherein the drive board is configured so the support board is proximate an edge of the drive board, and the support board is coupled to the drive board.

8. The deterrent device attachment of claim 7, wherein the support board comprises an insert having a first configuration and the housing comprises a second configuration, the second configuration configured to receive and capture the insert in the open area.

9. A deterrent device attachment, comprising:

a housing having an open area defined by area walls;

a support board on which a light source and a drive circuit are positioned, the support board having one or more protrusions on a lower insert portion;

one or more capture surfaces coupled to the area walls having a shape that is complementary to the one or more protrusions on the lower insert portion; and a member extending upward from an area wall of the housing defining an opening and a support extension configured to receive a fastener;

wherein the support board is coupled to a deterrent device at the member.

10. The deterrent device attachment of claim 9, wherein the support board is configured to couple between the support board and drive circuit.

11. The deterrent device attachment of claim 9, wherein the support board and drive board are coupled together prior to being inserted into the housing.

12. The deterrent device attachment of claim 9, wherein the support board has a surface area configured to radiate thermal energy to enable the light source and the support board to maintain an operating temperature range within a predetermined range.

13. An electronics assembly, comprising:

a support board positioned within a housing with an air gap between the support board and walls of the housing to limit first heat transfer from the support board;

a light source in contact with the support board, wherein the contact enables second heat transfer from a heated portion of the support board to a first end portion and a second end portion of the support board, the first end portion and the second end portion configured to dissipate heat generated away from the light source; and a drive board on which a drive circuit is positioned, the drive circuit configured to controllably energize the light source through at least two terminals positioned proximate to an opening in the drive board, wherein the support board comprises a tab portion extending from the second end portion that is shaped so that the tab portion can be inserted into the opening of the drive board to position at least two contacts proximate to the at least two terminals and wherein when the at least two terminals are separately electrically coupled to at least two electrical paths such that energy can pass from the drive circuit to the light source.

14. The electronics assembly of claim 13, wherein the support board includes a first surface, and the drive board includes a second surface coupled to the first surface prior to insertion into a housing.

15. The electronics assembly of claim 14, wherein the housing is configured to releasably couple to a deterrent device.

16. The electronics assembly of claim 13, wherein the support board is configured so that the first end portion is proximate an edge of the drive board, and the first end portion is coupled to the drive board.

17. The electronics assembly of claim 13, wherein the drive board is configured so the second end portion is proximate an edge of the drive board, and the second end portion is coupled to the drive board.

* * * * *